Feb. 28, 1967  N. C. REID  3,306,588
IMPELLER MIXER
Filed Nov. 19, 1965  2 Sheets-Sheet 1
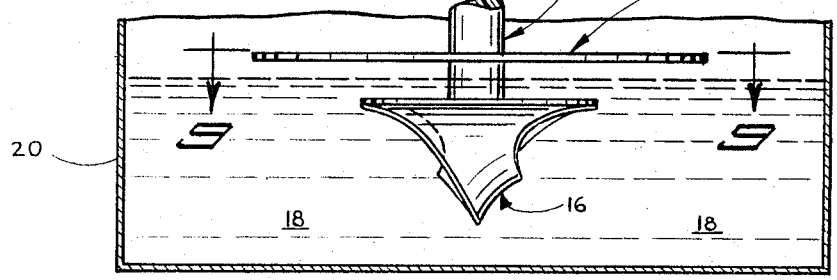
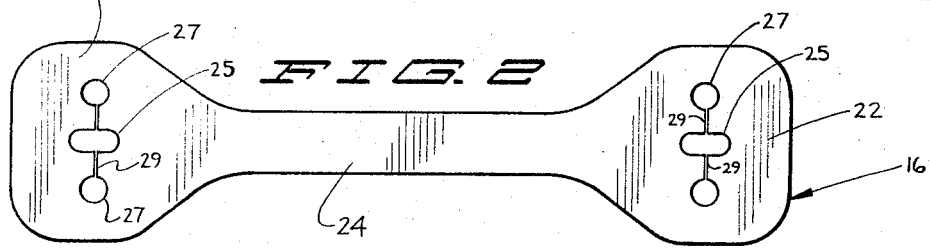
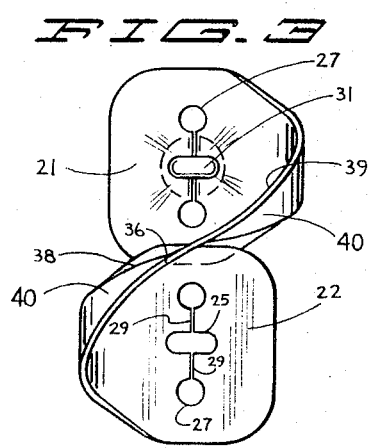
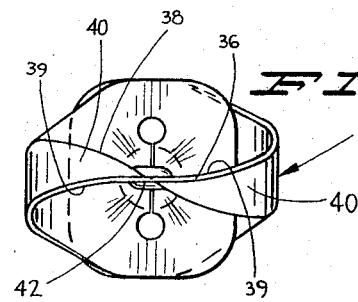
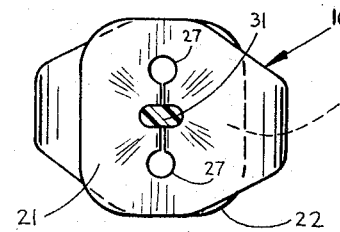
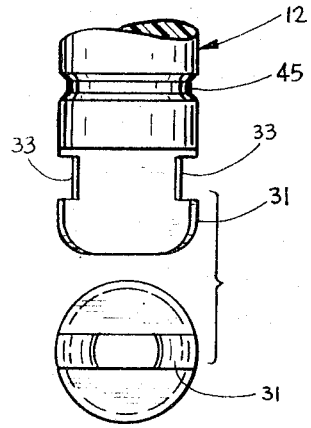
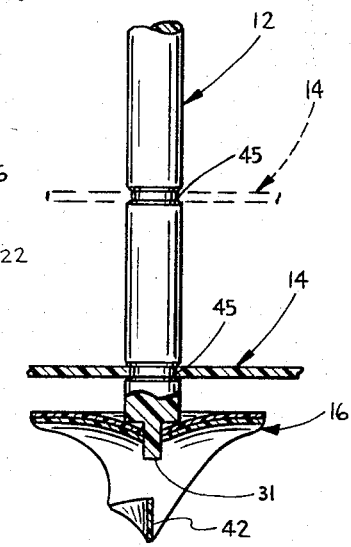
INVENTOR.
NORMAN C. REID
BY Daniel R. Johnson
AGENT Feb. 28, 1967 N. C. REID 3,306,588
IMPELLER MIXER
Filed Nov. 19, 1965 2 Sheets-Sheet 2
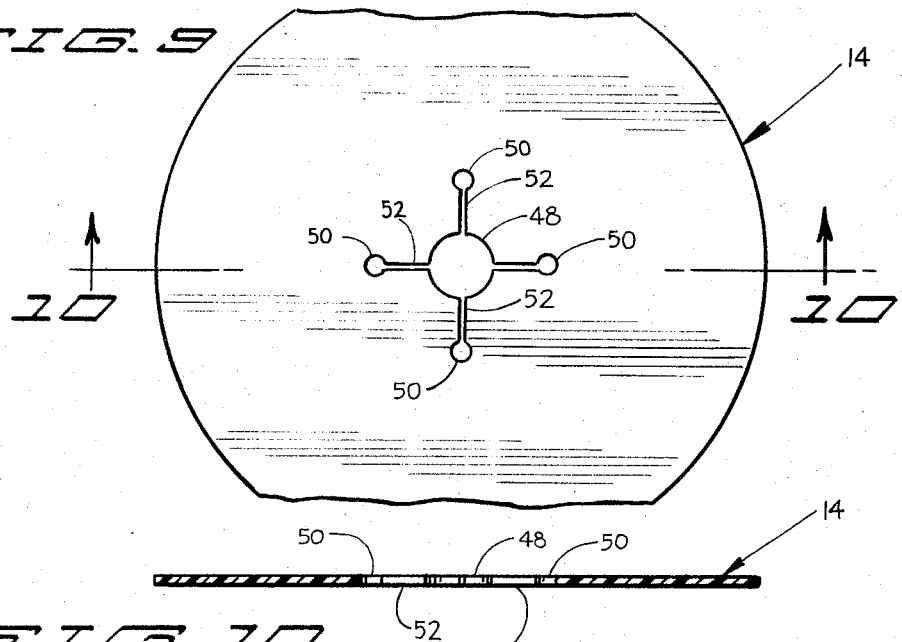
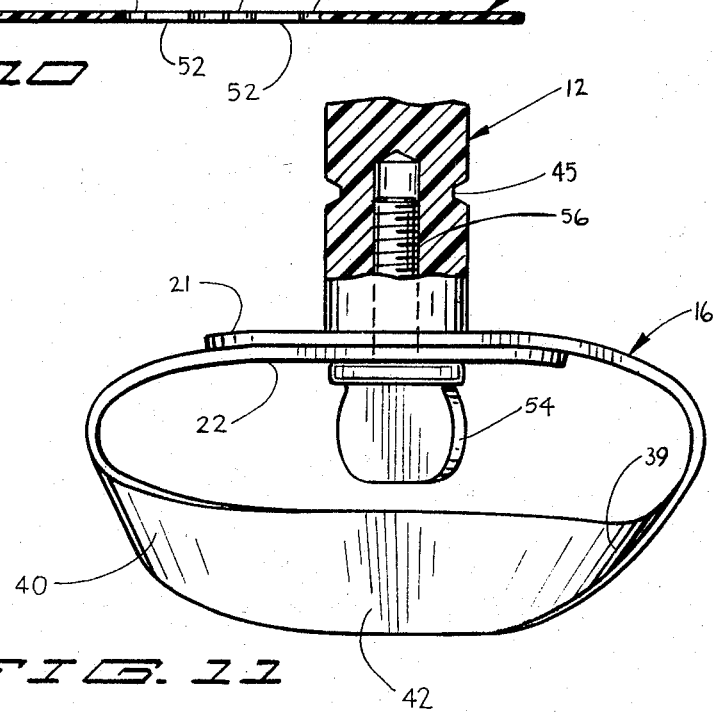
INVENTOR.
NORMAN C. REID
BY Daniel R. Johnson
AGENT

United States Patent Office 3,306,588
Patented Feb. 28, 1967

3,306,588
IMPELLER MIXER
Norman C. Reid, Minneapolis, Minn., assignor to Pako Corporation, Minneapolis, Minn., a corporation of Minnesota
Filed Nov. 19, 1965, Ser. No. 508,682
9 Claims. (Cl. 259—134)

This invention relates to mixing devices, and more particularly, to an improved mixing device which is composed of a few simple and inexpensive parts, and is adapted to be quickly disassembled for cleaning or replacement.

The present invention is designed to fulfill the longfelt need for a mixing device which provides adequate agitation, is adapted to be quickly and easily disassembled for cleaning, yet is low in cost. The mixing device of the present invention additionally features an impeller which is extremely safe and will not harm the walls of the vessel or mixing tank. An additional advantage of the invention resides in the provision of a mixing device which incorporates an impeller composed of a chemically inert material so as to be relatively immune to corrosion.

It is therefore the principal object of this invention to provide a mixing device which possesses an optimum design so as to achieve each of the above features, as well as others.

Other objects of the invention will become apparent as the description proceeds.

In the drawings,

FIG. 1 is a side elevational view of the overall mixing device shown submerged in a liquid contained within a mixing tank;

FIG. 2 is a plan elevation of the mixing impeller, showing the impeller disassembled and laid flat to illustrate its detailed construction;

FIG. 3 is a plan elevation of the impeller showing it partially disassembled in an intermediate position preparatory to final connection to the drive shaft;

FIG. 4 is a plan elevation of the impeller showing it in its normal operative position on the drive shaft;

FIG. 5 is a side elevational view showing the impeller connected to the drive shaft and with the vortex inhibitor plate removed;

FIG. 6 is a plan view taken on the line 6—6 of FIG. 5;

FIG. 7 is a sectional view taken on the line 7—7 of FIG. 5;

FIG. 8 includes two elevational views showing the detail of the end portion of the drive shaft;

FIG. 9 is a plan view of the vortex inhibitor plate taken on the line 9—9 of FIG. 1;

FIG. 10 is a sectional view taken on the line 10—10 of FIG. 9; and

FIG. 11 is a side elevational view showing a modified form of the mixing device according to the present invention.

The main components of the mixing device are the drive shaft 12, a vortex inhibitor plate 14 and an impeller 16. FIG. 1 shows the mixing device submerged in a chemical solution 18 which is contained within the mixing tank 20. The drive shaft 12 is driven by conventional means (not shown) situated above the mixing tank and supplies the driving force to the vortex inhibitor plate and impeller 16 which are mounted on the lower end of the drive shaft 12. Each of these main components of the mixing device will now be described in detail.

The impeller

The construction of the impeller 16 is best understood by reference to FIG. 2 wherein the impeller is shown disassembled and laid flat on a work surface. The impeller is formed from a single piece of resilient material such as nylon plastic. Accordingly, the impeller is well adapted to the economies of mass production and can be produced at a very low unit cost.

FIG. 2 shows the impeller 16 comprising a first end section 21, a similarly shaped opposite end section 22 and an elongated interconnecting section 24 which is formed contiguously between the two end sections. The end sections 21 and 22 are shown substantially rectangular in shape and are each provided with center slots 25, which provide the means for releasably connecting the impeller end sections to the end of the drive shaft 12. A pair of relief holes 27 are shown spaced laterally in conjunction with each of the slots 25 and small slits 29 are formed between each of the relief holes 27 and the slots 25.

FIG. 3 shows the impeller in an intermediate position preparatory to its final connection to the drive shaft 12. End section 21 is shown connected to the lower terminal end 31 of the drive shaft 12. This connection is achieved by slipping the terminal end 31 through the center slot 25 of the impeller end section 21. As this is being done, the slot 25 spreads sufficiently (due to the resilient action of slits 29 and relief holes 27) to allow the insertion of the terminal end 31. As best seen in FIG. 8, the terminal end 31 is provided with a reduced section 33 which is spaced from the outermost end of the drive shaft. The reduced section 33 (in cooperation with the design of the terminal end 31 of the drive shaft) provides a means for releasably securing the impeller end sections to the drive shaft 12. As stated above, the center slots 25 are designed to spread slightly as they are being connected to the terminal end 31 of the drive shaft. Accordingly, the end sections are adapted to slip over the terminal end 31 of the drive shaft and "snap" into place on the reduced section 33. The final operative shape of the impeller is achieved by twisting the impeller as in FIG. 3 to a position wherein the end section 22 overlies the end section 21 but extends in the reverse direction, the end section 21 being connected to the terminal end 31 in the same manner as end section 22. FIGS. 4 through 7 show this completed connection.

As will be readily appreciated, the impeller section 24 serves as the mixing blade for the impeller. By the novel construction of the impeller and the manner in which it is twisted and connected to the drive shaft 12, the section 24 forms a very efficient and desirable means for agitating the chemical solution 18. Note that the impeller section 24 forms a spiral shaped mixing blade having a leading edge 36, a trailing edge 38 and inner and outer contoured faces 39 and 40, respectively.

The terms "leading" and "trailing" have been assigned with reference to their relative positioning in the chemical solution, i.e., the leading edge 36 occurs below the trailing edge 38 when the impeller is in its normal operative position. It will be apparent that the outer contoured faces 39 are convex while the inner contoured faces 40 are concave. As best seen in the plan view of FIG. 4, the leading and trailing edges 36 and 38 are in spaced relation and extend through a vertical plane passing through the longitudinal axis of the drive shaft 12. In this manner, there is defined a substantially flat vertex 42 of the impeller.

The drive shaft

The drive shaft 12 is preferably composed of a rigid filled thermoplastic or other similar material such as asbestos or fiberglas filled nylon. This provides a very durable construction, as well as one which is chemically inert. The drive shaft 12 is in driving connection with the impeller 16 at its lower end as described above; and also is in driving connection with the vortex inhibitor plate 14. The plate 14 is releasably secured to the drive shaft 12 via the provision of the annular grooves 45.

These grooves are situated at various points along the axial direction of the shaft and thereby provide a series of connection points for the inhibitor plate 14. This enables vertical adjustment of the inhibitor plate 14 relative to the impeller 16, as is desirable when solutions of varying viscosity and depth are encountered. Since a vortex tends to form more easily in a shallow level of solution, the plate should be in the groove nearest the impeller when mixing shallow solutions, but should be placed farther from the impeller with increased depths. It has been determined that a preferred setting is one which places the plate so it is approximately two inches below the solution surface.

*The vortex inhibitor plate*

FIGS. 9 and 10 show the inhibitor plate 14 comprising a circular plastic disc of uniform thickness and having a central aperture 48 which is of a diameter less than the outer diameter of the shaft 12 but slightly greater than the inside diameter of the annular grooves 45. Relief holes 50 are shown spaced laterally and being in communication with the aperture 48 via the small slots 52. The slots and relief holes are preferably spaced every 90 degrees. This construction, in combination with the inherent resiliency of the plastic, enable the inhibitor plate 14 to be easily and quickly installed by merely slipping it over the shaft 12 and allowing it to "snap" into place within one of the grooves 45. Removal of the inhibitor plate is also easy since the resiliency is sufficient to allow the plate to be manually forced out of its position within the groove and side axially over the outside of the shaft 12.

*Modified form of FIG. 11*

FIG. 11 shows a modified form of the invention which employs a different means for connecting the impeller 16 to the shaft 12. In this form, a thumb screw 54 is adapted to extend through the central portions of the impeller sections 21 and 22 and threadably engage at 56 the lower interior end of the drive shaft 12. The thumb screw 54 securely holds the impeller 16 in driving connection with the shaft 12, yet is adapted for easy removal as is desirable when cleaning or replacing the impeller 16.

In operation, the mixing device of the present invention has fulfilled the longfelt need for a low cost mixing device which provides the necessary agitation, yet is adapted to be quickly and easily disassembled for cleaning. Note also that the device of the present device is extremely safe since the blade possesses sufficient resiliency to insure that injury is avoided even though a person accidently places his hands into the impeller when running. Other advantages are those manifested by a mixing device which is extremely durable and relatively immune to corrosion.

It is apparent that many variations and modifications may be made without departing from the true spirit of the invention and therefore the invention is to be limited only by the appended claims.

What is claimed is:
1. A mixing device comprising:
(1) a drive shaft;
(2) an impeller in driving connection with said shaft including,
first and second end sections adapted to be secured to said drive shaft,
an elongated interconnecting section formed between said end sections and being in twisted relation so as to form a blade having an upper leading edge and a lower trailing edge, said leading and trailing edges being in spaced relation and extending through a vertical plane passing through the longitudinal axis of said drive shaft; and
(3) a vortex inhibitor plate secured to said drive shaft at a point spaced from the point where said impeller end sections are secured to said shaft.

2. The combination as specified in claim 1 wherein said impeller and vortex inhibitor plate are composed of a resilient plastic material.

3. A mixing device comprising:
(1) a drive shaft;
(2) an impeller in driving connection with said shaft including,
first and second end sections being substantially rectangular in shape and including means for securing said end sections to said drive shaft,
an elongated interconnecting section formed between said end sections and being in twisted relation so as to form a blade having an upper leading edge and a lower trailing edge and inner and outer contoured faces, said leading and trailing edges being in spaced relation and extending through a vertical plane passing through the longitudinal axis of said drive shaft so as to define a substantially flat vertex section of said blade; and
(3) a vortex inhibitor plate secured to said drive shaft at a point spaced from the point where said impeller end sections are secured to said shaft.

4. The combination as specified in claim 3 wherein said means for securing said end sections to the drive shaft comprises a thumb screw threadably attached to the end of said drive shaft.

5. In combination with a drive shaft, an impeller in driving connection with said shaft comprising:
(1) first and second end sections adapted to be secured to said drive shaft;
(2) an elongated interconnecting section formed between said end sections and being in twisted relation so as to form a blade having an upper leading edge and a lower trailing edge and inner and outer contoured faces, said leading and trailing edges being in spaced relation and extending through a vertical plane passing through the longitudinal axis of said drive shaft so as to define a substantially flat vertex section of said blade.

6. The combination as specified in claim 5 wherein there is provided a vortex inhibitor plate secured to said drive shaft at a point spaced from the point where said end sections are secured to said shaft.

7. In combination with a drive shaft, an impeller in driving connection with said shaft and formed from a single piece of plastic material comprising:
(1) a first end section adapted to be releasably secured to said drive shaft;
(2) an opposite end section similarly adapted to be releasably secured to said drive shaft at a point adjacent said first end section, said opposite end section overlying said first section; and
(3) an elongated interconnecting section formed contiguously between said end sections and being in twisted relation so as to form a blade having an upper leading edge and a lower trailing edge and inner and outer contoured faces, said leading and trailing edges being in spaced relation and extending through a vertical plane passing through the longitudinal axis of said drive shaft so as to define a substantially flat vertex section of said blade.

8. The combination as specified in claim 7 wherein there is provided a vortex inhibitor plate adapted to be releasably secured to said drive shaft at a series of points spaced from the point where said impeller end sections are secured to said shaft.

9. A mixing device comprising:
(1) a drive shaft;
(2) an impeller in driving connection with said shaft including,
a first end section adapted to be releasably secured to said drive shaft,
an opposite end section similarly adapted to be releasably secured to said drive shaft at a point adjacent said first end section, said opposite end section overlying said first section, an elongated interconnecting section formed contiguously between said end sections and being in twisted relation so as to form a blade having an upper leading edge and a lower trailing edge and inner and outer contoured faces, said leading and trailing edges being in spaced relation and extending through a vertical plane passing through the longitudinal axis of said drive shaft so as to define a substantially flat vertex section of said blade; and (3) a vortex inhibitor plate adapted to be secured to said drive shaft at a series of points spaced from the point where said impeller end sections are secured to said shaft.

References Cited by the Examiner

UNITED STATES PATENTS

| 341,296 | 5/1886 | White | 259—144 X |
| 1,479,511 | 1/1924 | Parsons | 259—144 |
| 3,197,181 | 7/1965 | Hill | 259—95 |

FOREIGN PATENTS 334,438  3/1921  Germany.

WILLIAM I. PRICE, *Primary Examiner.*